(12) United States Patent
George Philip et al.

(10) Patent No.: US 11,626,049 B2
(45) Date of Patent: Apr. 11, 2023

(54) MANAGEMENT OF A ROLLABLE DISPLAY PANEL OF A DISPLAY DEVICE

(71) Applicant: QUALCOMM Incorporated, San Diego, CA (US)

(72) Inventors: Justin Antony George Philip, Hyderabad (IN); Pradeep Salloju, Hyderabad (IN); Jishan Gous Sayyad, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/302,337

(22) Filed: Apr. 30, 2021

(65) Prior Publication Data

US 2022/0351656 A1 Nov. 3, 2022

(51) Int. Cl.
*G06F 1/16* (2006.01)
*G09G 3/00* (2006.01)
*G01S 17/10* (2020.01)

(52) U.S. Cl.
CPC .............. *G09G 3/035* (2020.08); *G01S 17/10* (2013.01); *G06F 1/1652* (2013.01); *G09G 2340/045* (2013.01)

(58) Field of Classification Search
CPC .. G09G 3/035; G09G 2340/045; G01S 17/10; G06F 1/1652
See application file for complete search history.

(56) References Cited

U.S. PATENT DOCUMENTS

| 9,448,660 | B2 * | 9/2016 | Seo ......................... G06F 3/017 |
| 2018/0032106 | A1 * | 2/2018 | Yu .......................... G06F 1/1652 |
| 2018/0068612 | A1 | 3/2018 | Cho et al. |
| 2020/0142522 | A1 * | 5/2020 | Hong ..................... G06F 1/1652 |

OTHER PUBLICATIONS

International Search Report and Written Opinion—PCT/US2022/071282—ISA/EPO—dated Jun. 17, 2022.

* cited by examiner

*Primary Examiner* — Towfiq Elahi
(74) *Attorney, Agent, or Firm* — Qualcomm Incorporated

(57) ABSTRACT

In some aspects, a display device may receive a distance measurement from a sensor. The distance measurement may be indicative of a dimension of the rollable display panel of the display device. The display device may configure, based on the distance measurement, an output setting for displayed content of the rollable display panel according to the dimension. Numerous other aspects are described.

30 Claims, 8 Drawing Sheets

MANAGEMENT OF A ROLLABLE DISPLAY PANEL OF A DISPLAY DEVICE

FIELD OF THE DISCLOSURE

Aspects of the present disclosure generally relate to display devices and, for example, to management of a rollable display panel of a display device.

BACKGROUND

A user device may include a display device. The display device may be an output device for presentation of information in visual form. For example, the display device may include an output surface and a projecting mechanism that displays text and/or graphic images using a cathode ray tube (CRT), a liquid crystal display (LCD), a light-emitting diode (LED) display, an organic LED (OLED) display, a gas plasma display, or another image projection technology.

SUMMARY

In some aspects, a method for configuring displayed content of a rollable display panel includes receiving, by a display device, a distance measurement from a sensor, wherein the distance measurement is indicative of a dimension of the rollable display panel of the display device; and configuring, by the display device and based on the distance measurement, an output setting for displayed content of the rollable display panel according to the dimension.

In some aspects, a non-transitory computer-readable medium storing a set of instructions includes one or more instructions that, when executed by one or more processors of a display device, cause the display device to receive a distance measurement from a sensor, wherein the distance measurement is indicative of a dimension of a rollable display panel of the display device; and configure, based on the distance measurement, an output setting for displayed content of the rollable display panel according to the dimension.

In some aspects, an apparatus of a display device includes means for receiving a distance measurement from a sensor, wherein the distance measurement is indicative of a dimension of a rollable display panel of the display device; and means for configuring, based on the distance measurement, an output setting for displayed content of the rollable display panel according to the dimension.

In some aspects, a display device comprising a rollable display panel; a distance measurement sensor; and a controller configured to receive, from the distance measurement sensor, a distance measurement associated with a sensed signal of the distance measurement sensor; determine, based on the distance measurement, a dimension of a viewable portion of the rollable display panel; and perform, based on the dimension, an action associated with the viewable portion of the rollable display panel.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
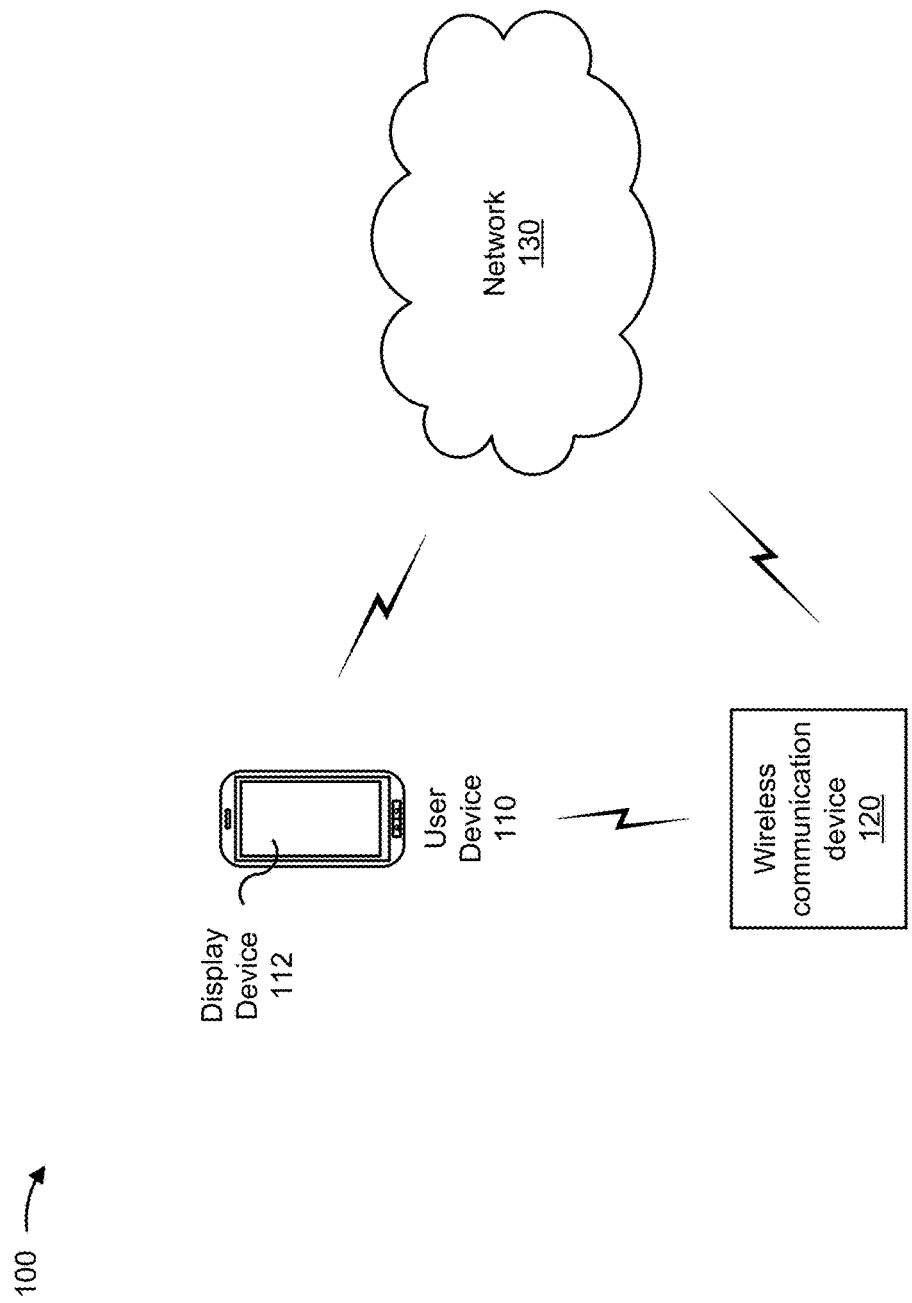
FIG. 1 is a diagram illustrating an example environment in which management of a rollable display panel of a display device described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A user device may include a display device for presenting visual content to a user. In some cases, the display device may include a rollable display panel that can be extended and/or retracted between a first position and a second position to adjust (e.g., increase or decrease) a viewable portion of the display panel. The viewable portion of the display device may be a portion of the display device that extends from, and/or is positioned outside of, an internal housing of the user device.

Commonly, a mechanical device (e.g., a motor, a set of rollers, and/or the like) may be used to extend and/or retract the rollable display panel. In some cases, the mechanical device may be calibrated to enable a controller of the user device to control a size of the viewable portion of the rollable display panel, to enable the rollable display panel to be uniformly extended and/or retracted (e.g., to enable a lower edge and an upper edge of the rollable display panel to extend at the same rate), and/or the like. However, over time, dust, temperature, impact caused by dropping the user device, and/or the like may cause physical changes to the mechanical device that may affect the operation of the mechanical device. For example, the physical changes to the mechanical device may affect the calibration of the mechanical device, which may prevent the controller from accurately controlling and/or determining the size of the viewable portion of the rollable display panel and/or may prevent the rollable display panel from being uniformly extended and/or retracted. Further, failure to accurately control and/or determine the size of the viewable portion may result in content being displayed on a portion of the rollable display panel positioned within the internal housing of the user device, which may result in unwanted power consumption.

Some implementations described herein enable a display device of a user device to accurately determine a current size of a viewable portion of a rollable display panel and to configure an output setting for displayed content based on the current size of the viewable portion. For example, the display device may receive a distance measurement from a sensor. The distance measure may be indicative of a dimension of the rollable display panel (e.g., a size of the viewable portion). The display device may configure an output setting for displayed content of the rollable display panel based on the distance measurement and/or the dimension of the rollable display panel.

In this way, the display device may accurately determine a size of a viewable portion of the rollable display panel. Further, the display device may utilize the distance measurement to determine an accuracy of a mechanical device configured to extend and/or retract the rollable display panel. For example, the mechanical device may include a stepper motor that provides a count of a counter mechanism indicating a quantity of rotations of the motor to the display device. The display device may determine an accuracy of the motor based on comparing a size of a viewable portion indicated by the quantity of rotations of the motor and a size of the viewable portion indicated by the distance measurement. The display device may cause the motor to be recalibrated when the accuracy satisfies a threshold.

FIG. 1 is a diagram of an example environment 100 in which systems and/or methods described herein may be implemented. As shown in FIG. 1, environment 100 may include a user device 110, a wireless communication device 120, and a network 130. Devices of environment 100 may interconnect via wired connections, wireless connections, or a combination of wired and wireless connections.

User device 110 includes one or more devices capable of including one or more display devices 112 having rollable display panels described herein. For example, user device 110 may include one or more devices capable of receiving, generating, storing, processing, and/or providing information associated with one or more rollable display panels described herein. More specifically, user device 110 may include a communication and/or computing device, such as a mobile phone (e. g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Similar to user device 110, wireless communication device 120 includes one or more devices capable of receiving, generating, storing, processing, and/or providing information associated with one or more rollable display panels described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
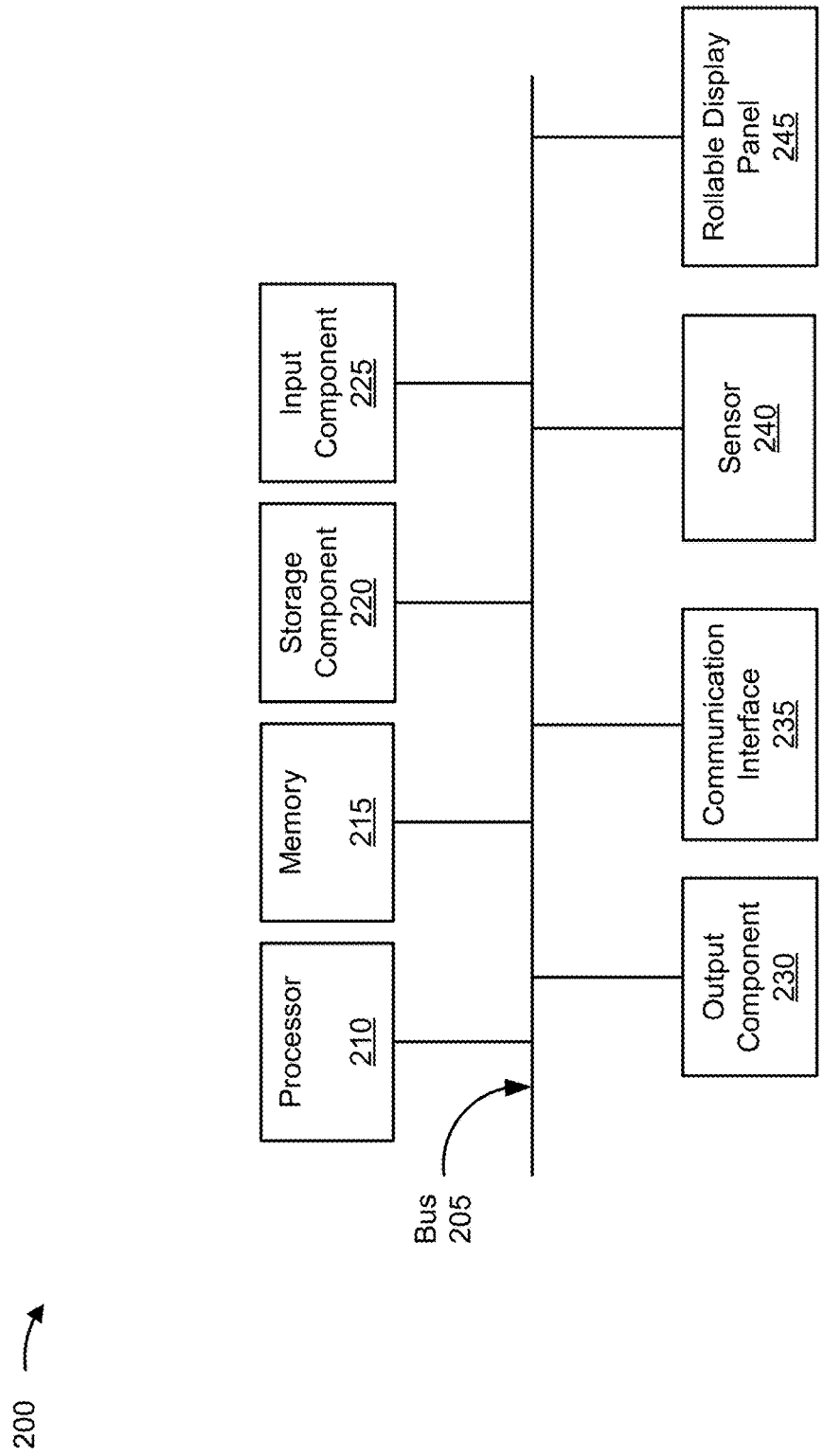
FIG. 2 is a diagram illustrating example components of one or more devices shown in FIG. 1, such as a user device and/or a wireless communication device, in accordance with the present disclosure.

FIG. 2 is a diagram illustrating example components of a device 200, in accordance with the present disclosure. Device 200 may correspond to a user device 110 and/or a wireless communication device 120. In some aspects, the user device 110 and/or the wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, and/or a rollable display panel 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

In some aspects, sensor 240 may include a light sensor capable of obtaining data indicative of a dimension of a rollable display panel of a display device, as described herein. The light sensor may include a light emitter capable of emitting a pulse of light and a light receiver capable of receiving the pulse of light and/or a reflection of the pulse of light. For example, the light sensor may include an infrared (IR) sensor, a LIDAR sensor, and/or the like.

Sensor 240 may include an optical sensor that has a field of view in which sensor 240 may determine one or more characteristics of an environment of device 200. In some aspects, sensor 240 may include a camera. For example, sensor 240 may include a low-resolution camera (e.g., a video graphics array (VGA)) that is capable of capturing images that are less than one megapixel, images that are less than 1216×912 pixels, and/or the like. Sensor 240 may be a low-power device (e.g., a device that consumes less than ten milliwatts of power) that has an always-on capability (e.g., to permit always-on facial detection, always-on character recognition, always-on object detection, and/or the like) while device 200 is powered on.

Additionally, or alternatively, sensor 240 may include magnetometer (e.g., a Hall effect sensor, an anisotropic magnetoresistive (AMR) sensor, a giant magnetoresistive sensor (GMR), and/or the like), a location sensor (e. g., a GPS receiver, a local positioning system (LPS) device (e.g., that uses triangulation and/or multi-lateration, among other examples), and/or the like), a gyroscope (e. g., a micro-electro-mechanical systems (MEMS) gyroscope or a similar type of device), an accelerometer, a speed sensor, a motion sensor, an infrared sensor, a temperature sensor, a pressure sensor, and/or the like.

Rollable display panel 245 includes output surface capable of using image projection technology (e.g., liquid crystal display (LCD), light-emitting diode (LED), organic LED (OLED), gas plasma, and/or the like) to present content in visual form. The rollable display panel 245 may comprise a flexible structure that allows at least a portion of the rollable display panel 245 to extend from and/or retract into an interior portion of a device (e.g., user device 110 and/or wireless communication device 120) to vary a size of the output surface that is used to present content in visual form, as described herein.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for receiving a distance measure from a sensor, the distance measurement being indicative of a dimension of a rollable display panel of a display device, and means for configuring, based on the distance measurement, an output setting for displayed content of the rollable display panel according to the dimension. In some aspects, such means may include one or more components of device 200 described in connection with FIG. 2, such as bus 205, processor 210, memory 215, storage component 220, input component 225, output component 230, communication interface 235, a sensor 240, and/or rollable display panel 245.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
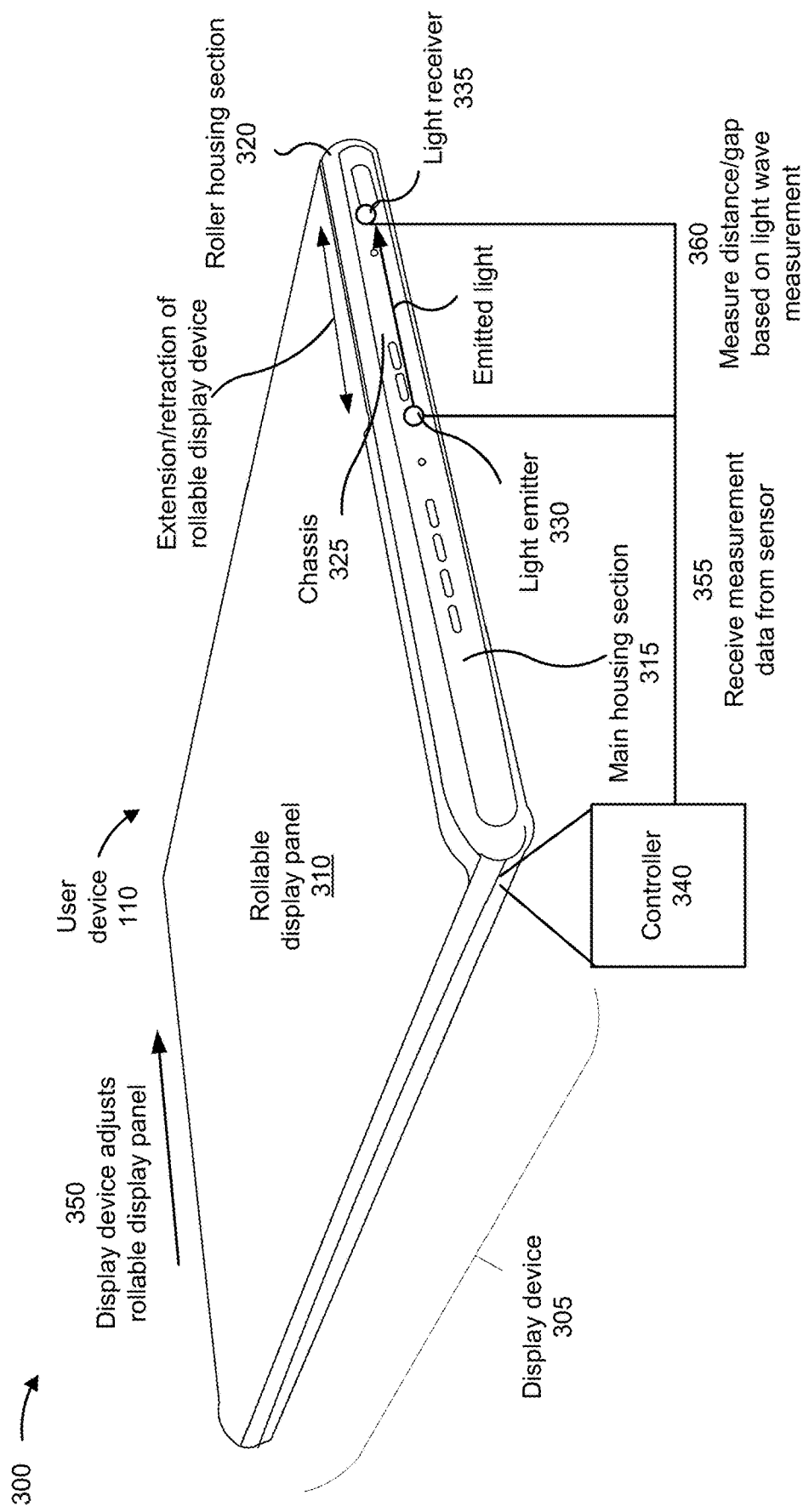
FIGS. 3A, 3B, 4, and 5 are diagrams illustrating examples associated with management of a rollable display panel of a display device, in accordance with the present disclosure.
Figure 3B:
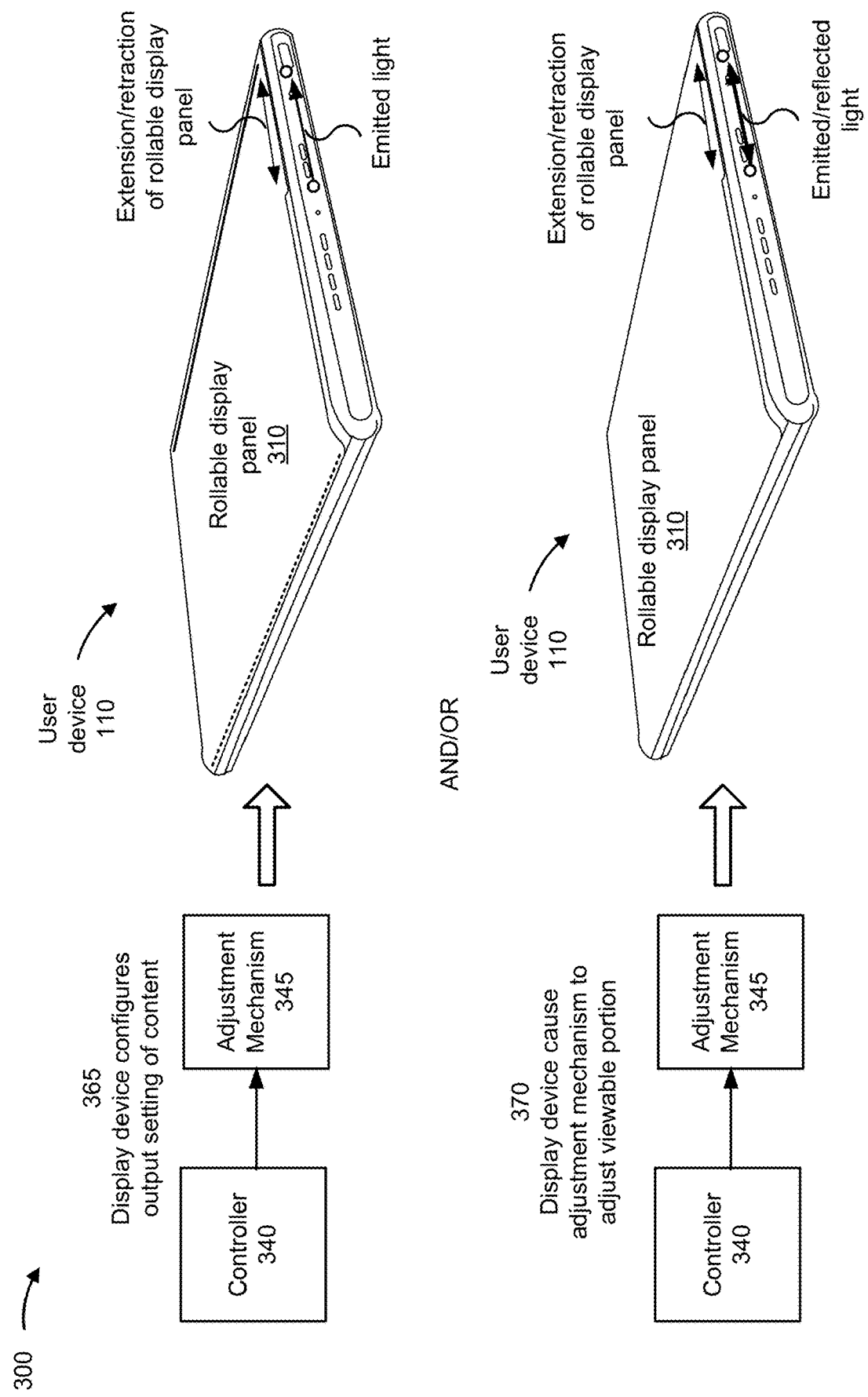

FIGS. 3A and 3B are diagrams illustrating an example 300 associated with management of a rollable display panel of a display device, in accordance with the present disclosure. As shown in FIGS. 3A and 3B, a display device 305 (e.g., display device 112) of a user device 110 includes a rollable display panel 310, a main housing section 315, a roller housing section 320, a chassis 325, a sensor 240 (e.g., a light emitter 330 and a light receiver 335, as shown), a controller 340, and an adjustment mechanism 345. The rollable display panel 310, the main housing section 315, the roller housing section 320, the chassis 325, the sensor 240, the controller 340, and the adjustment mechanism 345 are described in greater detail below.

As shown in FIG. 3A, and by reference number 350, the display device 305 adjusts the rollable display panel 310. A user may provide an input to the user device 110. The input may be associated with adjusting a size of a viewable portion of the rollable display panel 310. For example, the user may provide the input via an input element displayed via the rollable display panel 310, a physical button included on the main housing section 315 and/or the roller housing section 320, and/or the like.

The controller 340 may receive the input and may cause the adjustment mechanism 345 to adjust the rollable display panel 310 based on the input. In some aspects, the input indicates a size of the viewable portion of the rollable display panel 310. For example, the input may indicate a distance between an end of the main housing section 315 and an end of the roller housing, a length of a side (e.g., a side adjacent to the main housing section 315) of the rollable display panel 310, and/or the like.

The controller 340 may determine a new size of the viewable portion of the rollable display panel 310 based on the size of the viewable portion indicated by the input. The controller 340 may determine a current size of the viewable portion based on accessing information stored in a memory associated with the display device 305. For example, the information stored in the memory may include information indicating a current size of the viewable portion of the rollable display panel 310, a current distance between an end of the main housing section 315 and the roller housing section 320, and/or the like. The controller may determine the current size of the viewable portion based on the information indicating the current size of the viewable portion of the rollable display panel 310, the current distance between the end of the main housing section 315 and the roller housing section 320, and/or the like.

The controller 340 may determine a difference between the current size of the viewable portion and the new size of the viewable portion. The controller 340 may determine a size of a portion of the rollable display panel 310 to be extended from, or retracted into, an inner portion of the main housing section 315 based on the difference between the current size of the viewable portion and the new size of the viewable portion. The controller 340 may cause the adjustment mechanism 345 to adjust the rollable display panel 310 to account for the difference between the current size of the viewable portion and the new size of the viewable portion.

As shown in FIG. 3A, the controller 340 causes the adjustment mechanism 345 (shown in FIG. 3B) to cause the rollable display panel 310 to transition from a fully retracted position to an extended position. In some aspects, the fully retracted position corresponds to a smallest size of the viewable portion of the rollable display panel 310. For example, in the fully retracted position, the roller housing section 320 may be positioned adjacent to an end of the main housing section 315 and/or a distance between the light emitter 330 and the light receiver 335 may be a minimum distance (e.g., 0 cm, 0.1 cm, and/or the like).

In some aspects, the extended position corresponds to a size of a viewable portion of the rollable display panel 310 that is greater than the smallest size of the viewable portion. For example, the extended position may correspond to a fully extended position (e.g., a size of the viewable portion is a maximum size), a partially extended position (e.g., a size of the viewable portion is greater than the smallest size and/or less than the maximum size), and/or the like.

As shown by reference number 355, the controller 340 receives measurement data from the sensor 240 (e.g., the light emitter 330 and/or the light receiver 335, as shown in FIG. 3A). In some aspects, the measurement data includes information identifying a distance between the main housing section 315 and the roller housing section 320. For example, the sensor 240 may obtain data indicating a distance between the main housing section 315 and the roller housing section 320. The sensor 240 may determine the distance between the main housing section 315 and the roller housing section 320 based on the obtained data in a manner similar to that described below. The sensor 240 may provide information indicating the distance between the main housing section 315 and the roller housing section 320 to the controller 340.

Alternatively, and/or additionally, the controller 340 determines a distance between the main housing section 315 and the roller housing section 320 based on the measurement data. In some aspects, the sensor 240 includes the light emitter 330 and the light receiver 335. The light emitter 330 may be positioned at an end of the main housing section 315, and the light receiver 335 may be positioned on an end of the roller housing section 320 opposite of the light emitter 330. In some aspects, the roller housing section 320 is slidable along the chassis 325 to adjust a size of a viewable portion of the rollable display panel 310, as described below with respect to FIG. 4. The light emitter 330 may emit a pulse of light that is received by the light receiver 335. The light receiver 335 may provide received light information associated with the light received by the light receiver 335 to the controller 340.

The received light information may include a light wave measurement that indicates one or more characteristics associated with the light received by the light receiver 335. For example, the received light information may include information indicating an amount of light received by the light receiver 335, a wavelength of a light wave received by the light receiver 335, a frequency of a light wave received by the light receiver 335, an amplitude of a light wave received by the light receiver 335, and/or the like.

As shown by reference number 360, the controller 340 measures a distance and/or a gap between the light emitter 330 and the light receiver 335 based on a light wave measurement included in the measurement data. The controller 340 may determine a distance between the light emitter 330 and the light receiver 335 based on the received light information. The controller 340 may determine a distance between the main housing section 315 and the roller housing section 320 based on the distance between the light emitter 330 and the light receiver 335. The controller 340 may determine a size of a viewable portion of the rollable display panel 310 based on the distance between the main housing section 315 and the roller housing section 320.

For example, the controller 340 may determine a length of the main housing section 315 and/or a length of the roller housing section 320 based on accessing a data structure (e.g., a database, a table, a list, and/or the like) storing information indicating the length of the main housing section 315 and/or the length of the roller housing section 320. The controller may add the distance between the main housing section 315 and the roller housing section 320 to the length of the main housing section 315 to calculate a dimension (e.g., a length of a side of the viewable portion of the rollable display panel 310). The controller 340 may calculate the size of the viewable portion of the rollable display panel 310 based on the length of the side of the viewable portion and the length of the roller housing section 320. For example, the controller 340 may determine the size of the viewable portion based on multiplying the length of the side of the viewable portion and the length of the roller housing section 320.

In some aspects, the light emitter 330 is co-located with the light receiver 335 at an end of the main housing section 315. For example, the light emitter 330 and the light receiver 335 may be included in a radar device, a LIDAR device, and/or the like positioned at an end of the main housing section 315. The light emitter 330 may emit a pulse of light and the light receiver 335 may receive light reflected by the roller housing section 320. The controller 340 may receive information indicating an amount of light emitted by the light emitter 330 and/or an amount of reflected light received by the light receiver 335. The controller 340 may determine a distance between roller housing section 320 and end of the main housing section 315 based on the amount of reflected light received by the light receiver 335. The controller 340 may determine a size of a viewable portion of the rollable display panel 310 based on the distance between the roller housing section 320 and end of the main housing section 315. In some aspects, the controller 340 determines the size of the viewable portion of the rollable display panel 310 in a manner similar to that described above.

Figure 4:
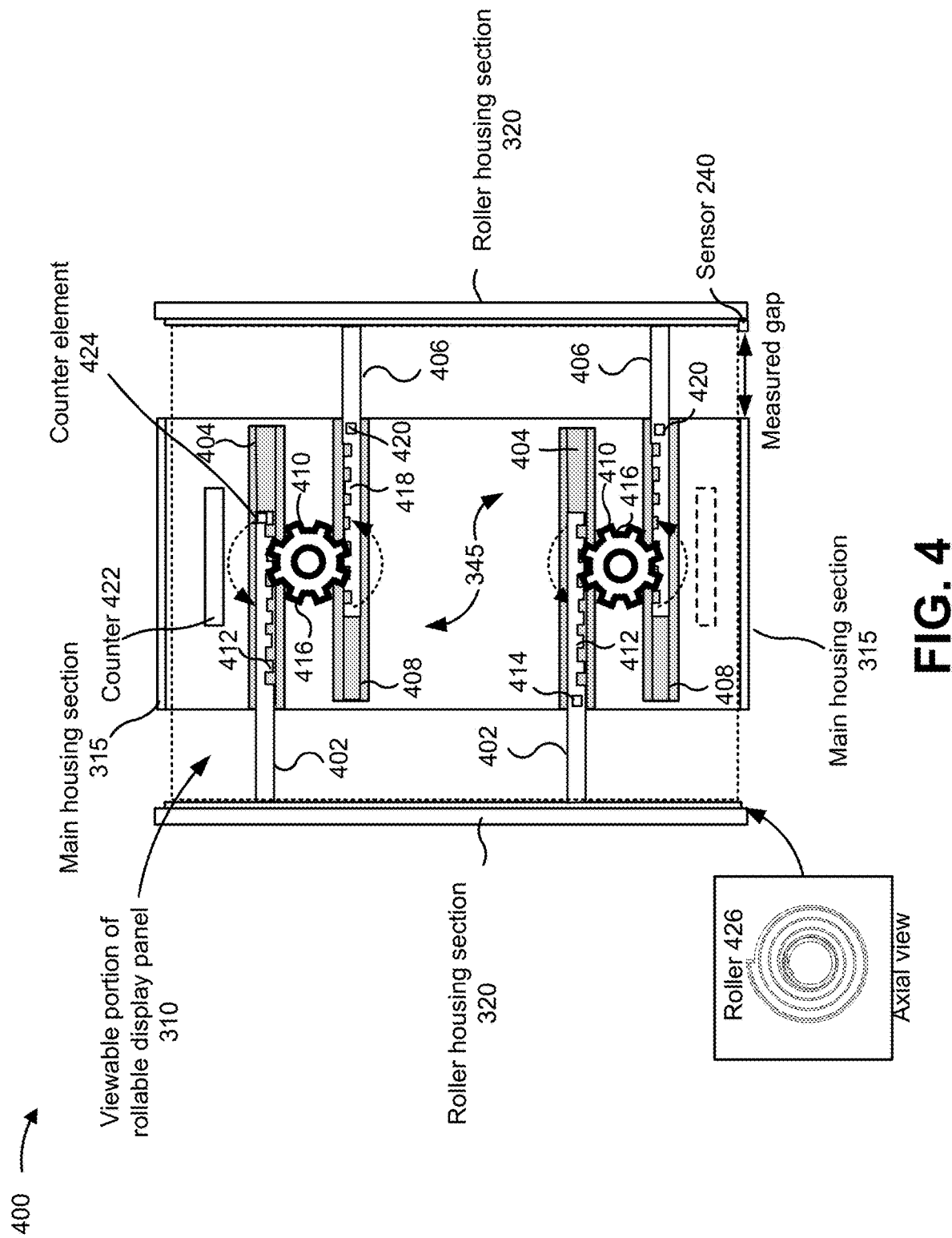

In some aspects, the controller 340 determines an accuracy associated with the adjustment mechanism 345 based on determining the size of the viewable portion of the rollable display panel 310. The adjustment mechanism 345 may include a motor, a counter, and a counter element (e.g., counter 422 and/or counter element 424, as shown in FIG. 4). The counter may receive information indicating a quantity of rotations of the motor from the counter element. The counter may provide the information indicating the quantity of rotations to the controller 340. The controller 340 may determine an intended size of the viewable portion of the rollable display panel 310 based on the quantity of rotations of the motor. The controller 340 may determine an accuracy associated with the adjustment mechanism 345 based on comparing the intended size of the viewable portion and the size of the viewable portion. For example, the controller 340 may determine the accuracy associated with the adjustment mechanism 345 based at least in part on a difference between the intended size of the viewable portion and the size of the viewable portion.

In some aspects, the controller 340 determines that the difference between the intended size of the viewable portion and the size of the viewable portion satisfies a difference threshold. The controller 340 may determine to recalibrate the adjustment mechanism 345 based on the difference between the intended size of the viewable portion and the size of the viewable portion satisfying the threshold. In some aspects, the controller 340 recalibrates the adjustment mechanism 345 based at least in part on calibrating the counter of the adjustment mechanism 345 to account for the difference between the intended size of the viewable portion and the size of the viewable portion.

In some aspects, as shown in FIG. 3B, and by reference number 365, the display device 305 configures an output setting of content. The display device 305 may configure an output setting of content to cause the content to be displayed via the viewable portion of the rollable display panel 310. For example, the display device 305 may configure a dimension of the display content to correspond to a dimension of the viewable portion of the rollable display panel 310, an aspect ratio of the display content to correspond to an aspect ratio associated with the size of the viewable portion of the rollable display panel 310, and/or the like.

As shown by reference number 370, the display device 305 causes the adjustment mechanism 345 to adjust the viewable portion of the rollable display panel 310. In some aspects, the display device 305 (e.g., the controller 340) causes the adjustment mechanism 345 to adjust the viewable portion of the rollable display panel 310 based on a user input in a manner similar to that described above with respect to FIG. 3A.

Alternatively, and/or additionally, the display device 305 may cause the adjustment mechanism 345 to adjust the viewable portion of the rollable display panel 310 to reduce a risk of damage to the display device 305 (e.g., the rollable display panel 310). In some aspects, the controller 340 determines that a dimension of the rollable display panel 310 (e.g., a size of the viewable portion, a length of a side of the rollable display panel 310, and/or the like) satisfies a threshold.

The controller 340 may monitor data obtained by another sensor 240 of the user device 110 based on the dimension of the rollable display panel 310 satisfying the threshold. For example, the controller 340 may monitor data obtained by an accelerometer, a gyroscope, a temperature sensor, and/or the like to determine whether the user device 110 has been dropped, is overheating, and/or the like. The controller 340 may cause the adjustment mechanism 345 to reduce a size of the dimension of the rollable display panel 310 when the data obtained by the other sensor 240 indicates that the user device 110 has been dropped, is overheating, and/or the like. In this way, the controller 340 may reduce a risk of damage to the rollable display panel 310.

As indicated above, FIGS. 3A and 3B are provided as an example. Other examples may differ from what is described with respect to FIGS. 3A and 3B.

FIG. 4 is a diagram illustrating an example 400 associated with management of a rollable display panel of a display device, in accordance with the present disclosure. FIG. 4 is a top interior view of the display device 305 in an extended state.

As shown in FIG. 4, the adjustment mechanism 345 is configured to permit the rollable display panel 310 to extend from, and/or retract into, the inner housing of the display device 305. The adjustment mechanism 345 may include a first set of slide rails 402, a first set of slide tracks 404, a second set of slide rails 406, a second set of slide tracks 408, and a set of gears 410. The first set of slide rails 402, which may extend from an inner surface of the roller housing section 320, may be configured to be slidably received by the first set of slide tracks 404, which may be provided (e.g., as slots) in an interior surface of the user device 110. Each of the first set of slide rails 402 may include a first plurality of teeth 412 and a first stop element 414. The first plurality of teeth 412 may be configured to engage gear teeth 416 of the set of gears 410. In some aspects, the set of gears 410 are provided within a hollow interior of the user device 110.

Each of the set of gears 410 may be configured to rotate about a rotational axis that is perpendicular to a lateral plane of the user device 110. The first stop element 414 may be configured to prevent the first set of slide rails 402 from being separated from the first set of slide tracks 404.

Similarly, the second set of slide rails 406, which may extend from inner surface of the roller housing section 320 that is opposite to the inner surface from which the first set of slide rails 402 extend, may be configured to be slidably received by the second set of slide tracks 408. The second set of slide tracks 408 may be provided in the hollow interior of the user device 110. Each of the second set of slide rails 406 may include a second plurality of teeth 418 and a second stop element 420. The second plurality of teeth 418 may be configured to engage the gear teeth 416 of the set of gears 410. The second stop element 420 may be configured to prevent the second set of slide rails 406 from being separated from the second set of slide tracks 408.

The rollable display panel 310 may be attached to an upper surface of the first set of slide rails 402 and/or the second set of slide rails 406. For example, the rollable display panel 310 may be laminated, glued, and/or the like to the upper surface of the first set of slide rails 402 and/or the second set of slide rails 406. The adjustment mechanism 345 may be configured to adjust the position of the first set of slide rails 402 and/or the second set of slide rails 406 within the first set of slide tracks 404 and/or the second set of slide tracks 408, respectively, by equal distances to cause the rollable display panel 310 to be uniformly extended and/or retracted from an inner housing of the user device 110. In this way, the adjustment mechanism 345 may cause the rollable display panel 310 to be symmetrically expanded and/or retracted to vary a size of a viewable portion of the rollable display panel 310.

In some aspects, as shown in FIG. 4, the adjustment mechanism 345 includes a counter 422 and a counter element 424. The counter element 424 may be configured to obtain data associated with the rotation of the set of gears 410 and/or a roller 426. The roller 426 may be located in an inner portion of the roller housing section 320. The rollable display panel 310 may travel around the roller 426 as the rollable display panel 310 is extended and/or retracted. The counter element 424 may be configured to determine a quantity of rotations of the set of gears 410, a quantity of rotations of the roller 426, a rotational distance traveled by the set of gears 410, a rotational distance traveled by the roller 426, a portion of the second plurality of teeth 418 engaged by the gear teeth 416, and/or the like. The counter element 424 may provide the obtained data to the counter 422. The counter 422 may translate the obtained data into information indicating a quantity of rotations associated with the set of gears 410, a quantity of rotations associated with the roller 426, a size of the rollable display panel 310 extended from and/or retracted into the inner housing of the user device 110, and/or the like. The counter 422 may provide the information to the controller 340 in a manner similar to that described above with respect to FIGS. 3A and 3B.

As indicated above, FIG. 4 is provided as an example. Other examples may differ from what is described with respect to FIG. 4.

Figure 5:
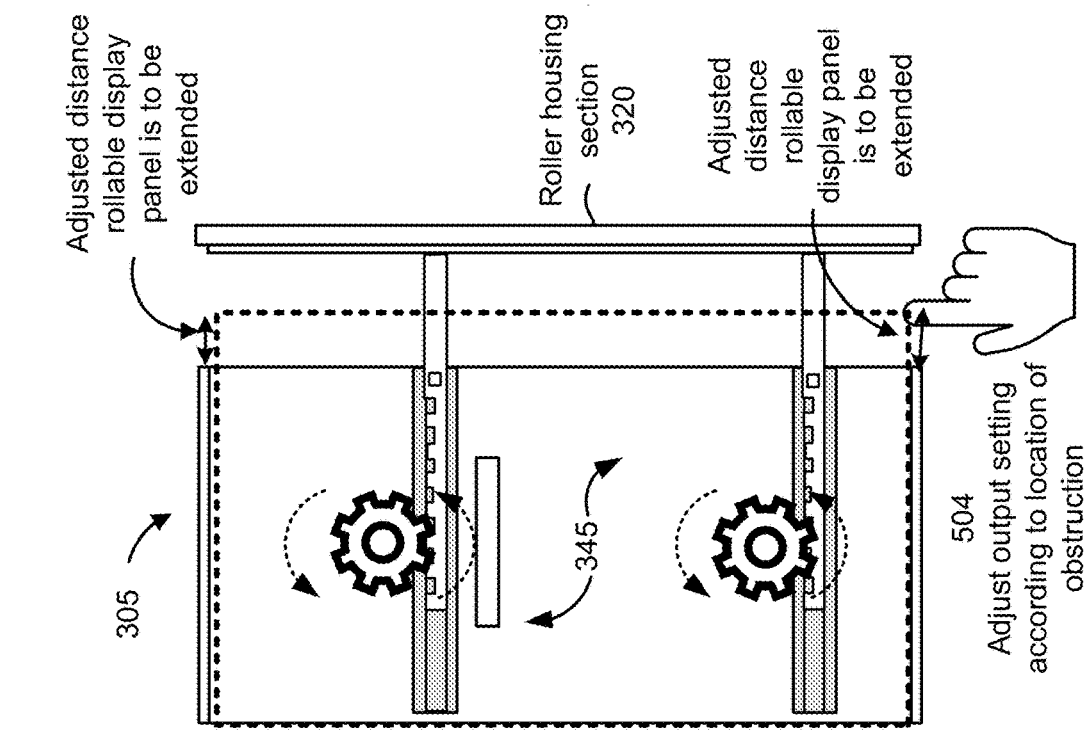
Figure 5:
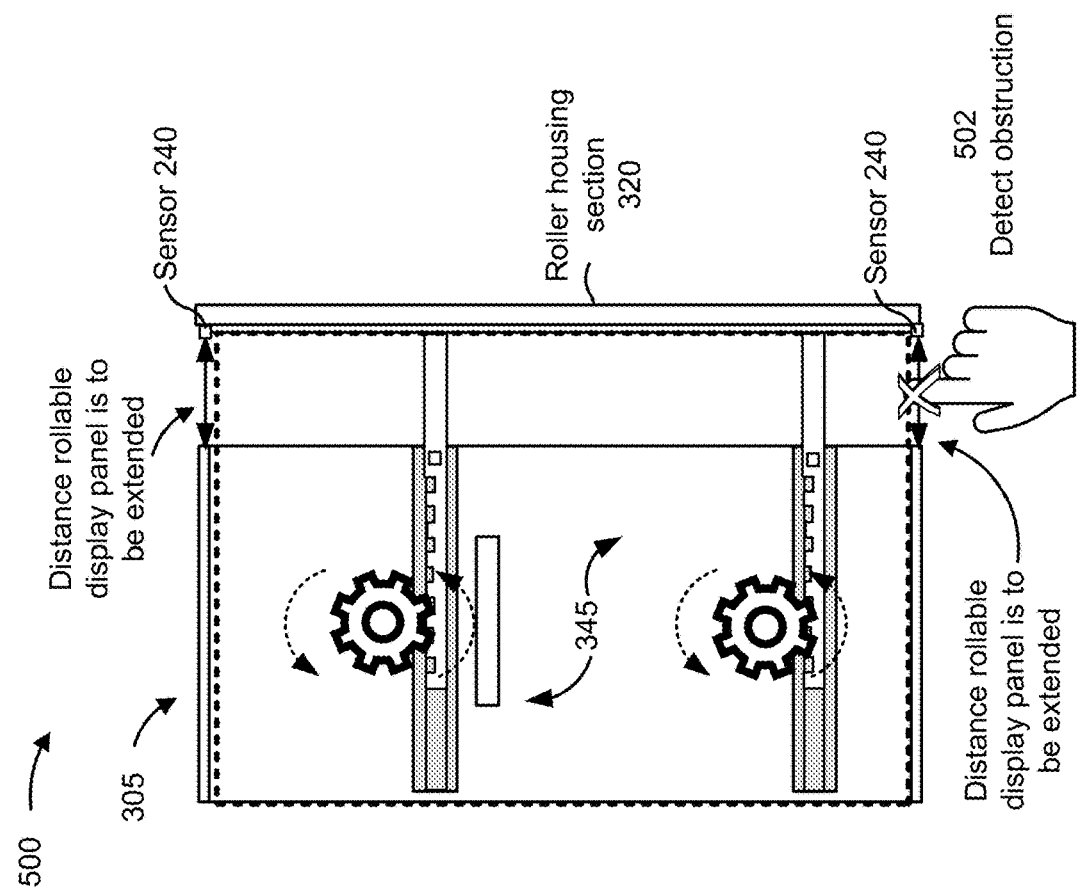

FIG. 5 is a diagram illustrating an example 500 associated with management of a rollable display panel of a display device, in accordance with the present disclosure. As shown in FIG. 5, the display device 305 modifies an operation of the adjustment mechanism 345 based at least in part on detecting an obstruction that interferes with a movement of the rollable display panel 310 (indicated by dashed lines in FIG. 5).

As shown by reference number 502, the display device 305 detects an obstruction (e.g., a finger of a user in a path of the rollable display panel 305 as the rollable display panel extends from an inner housing of the user device 110). In some aspects, the sensor 240 includes the light emitter 330 and the light receiver 335. In some aspects, the light emitter 330 is positioned at an end of the main housing section 315 and the light receiver 335 is positioned on the roller housing section 320, in a manner similar to that described above.

The sensor 240 may detect the obstruction based on an amount of light received by the light receiver 335. For example, the sensor 240 may determine that an amount of light received by the light receiver 335 satisfies a threshold (e.g., is less than a threshold amount of light). The sensor 240 may detect the obstruction based on the amount of light received by the light receiver 335 satisfying the threshold.

In some aspects, the light receiver 335 is co-located with the light emitter 330. For example, the light emitter 330 and the light receiver 335 may be positioned at an end of the main housing section 315, in a manner similar to that described above. The sensor 240 may detect the object based on an amount of reflected light received by the light receiver 335. For example, the light emitter 330 and the light receiver 335 may be included in a LIDAR device. The light emitter 330 may emit a pulse of light. The light receiver 335 may receive light reflected by an object. The sensor 240 may detect the object based on light reflected off the object and received by the light receiver 335.

In some aspects, the sensor 240 determines distance data indicating a location of the detected object based on the light and/or reflected light received by the light receiver 335. In some aspects, the sensor 240 determines the distance data indicating the location of the detected object in a manner similar to that described above with respect to FIG. 3A.

The sensor 240 may provide the distance data to the controller 340. The controller may determine a location of the detected object relative to content displayed via the rollable display panel 310, relative to an edge of the rollable display panel 310, relative to the light emitter 330, and/or the like. The controller may determine an adjusted size of a viewable portion of the rollable display panel 310 based on the location of the detected object. The adjusted size of the viewable portion may prevent the roller housing section 320 from contacting the detected object. For example, the adjusted size of the viewable portion may correspond to a location of the roller housing section 320 that is closer to the end of the main housing section 315 relative to the location of the detected object.

As shown by reference number 504, the display device 305 (e.g., the controller 340) adjusts an output setting according to the location of the obstruction (e.g., the location of the detected object). In some aspects, the controller 340 configures an output setting of the displayed content based on the adjusted size of the viewable portion of the rollable display panel 310. In some aspects, the output setting is configured to cause an edge of the displayed content and/or an edge of the rollable display panel 310 to substantially align with a location of the detected object.

As indicated above, FIG. 5 is provided as an example. Other examples may differ from what is described with respect to FIG. 5.

Figure 6:
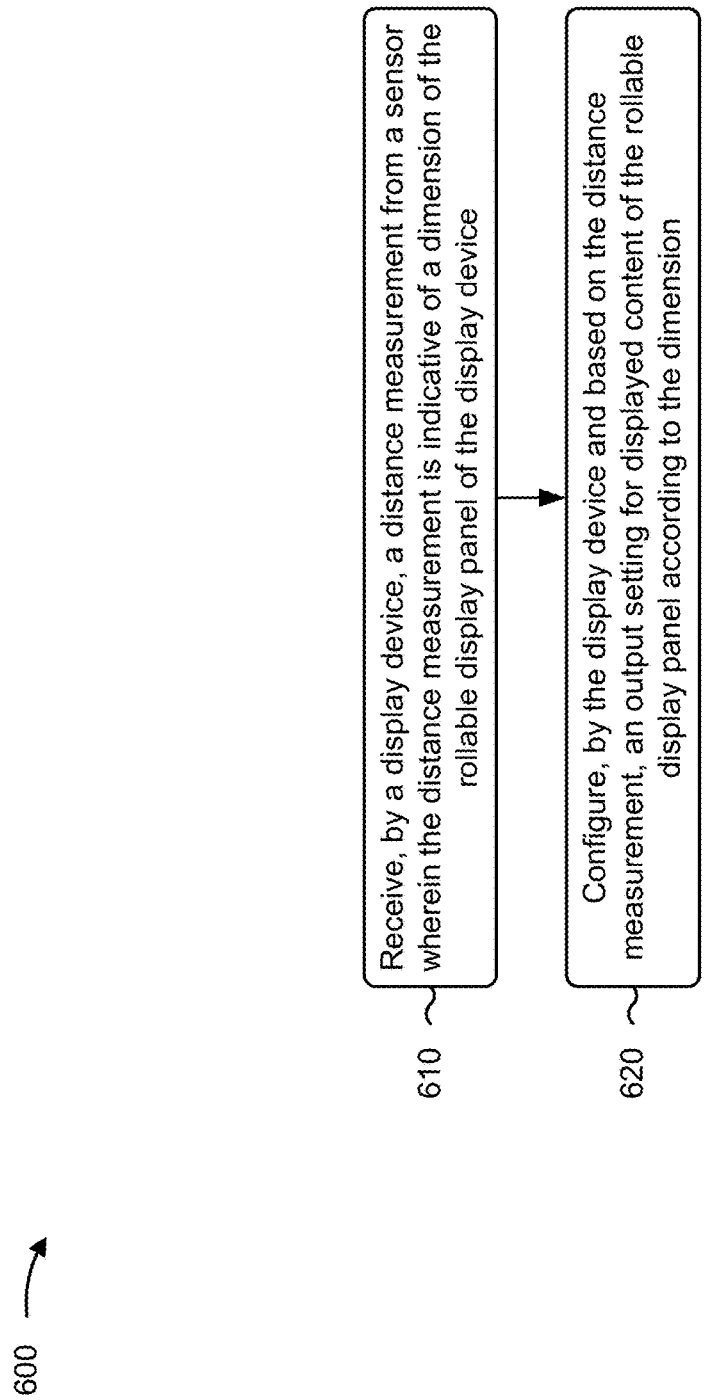
FIGS. 6 and 7 are flowcharts of example processes associated with management of a rollable display panel of a display device, in accordance with the present disclosure.

FIG. 6 is a diagram illustrating an example process 600 performed, for example, by a display device, in accordance with the present disclosure. Example process 600 is an example where the display device (e.g., a display device of user device 110 and/or wireless communication device 120) performs operations associated with management of a rollable display panel of a display device.

As shown in FIG. 6, in some aspects, process 600 may include receiving a distance measurement from a sensor, wherein the distance measurement is indicative of a dimension of the rollable display panel of the display device (block 610). For example, the display device (e.g., using processor 210, memory 215, storage component 220, input component 225, output component 230, communication interface 235, sensor 240, and/or rollable display panel 245) may receive a distance measurement from a sensor, as described above. In some aspects, the distance measurement is indicative of a dimension of the rollable display panel of the display device.

As further shown in FIG. 6, in some aspects, process 600 may include configuring, based on the distance measurement, an output setting for displayed content of the rollable display panel according to the dimension (block 620). For example, the display device (e.g., using processor 210, memory 215, storage component 220, input component 225, output component 230, communication interface 235, sensor 240, and/or rollable display panel 245) may configure, based on the distance measurement, an output setting for displayed content of the rollable display panel according to the dimension, as described above.

Process 600 may include additional aspects, such as any single aspect or any combination of aspects described below and/or in connection with one or more other processes described elsewhere herein.

In a first aspect, the sensor includes a light emitter and a light receiver. A distance between the light emitter and the light receiver may be configured to increase as a length of the dimension increases or decrease as a length of the dimension decreases.

In a second aspect, alone or in combination with the first aspect, process 600 includes determining that the dimension satisfies a dimension threshold, monitoring, based on determining that the dimension satisfies the dimension threshold, movement data from another sensor of the display device, and causing, based on the movement data indicating that a movement characteristic of the display device satisfies a movement threshold, an adjustment mechanism to reduce a size of the dimension.

In a third aspect, alone or in combination with one or more of the first and second aspects, process 600 includes receiving, from an adjustment mechanism that is configured to adjust the dimension, a counter position that is representative of the dimension of the rollable display panel, determining that a difference between the counter position of the dimension and a sensor value of the dimension that is determined from the distance measurement satisfies a difference threshold, and calibrating the counter of the adjustment mechanism to account for the difference.

In a fourth aspect, alone or in combination with one or more of the first through third aspects, process 600 includes receiving another distance measurement that is indicative of an obstruction between a light emitter of the sensor and a light receiver of the sensor, determining a location of the obstruction relative to the displayed content, and configuring, based on the other distance measurement, the output setting of the displayed content to have an edge that aligns with the location of the obstruction.

In a fifth aspect, alone or in combination with one or more of the first through fourth aspects, the rollable display panel is configured to be received by a roller when the dimension is reduced, or extended from the roller when the dimension is increased.

In a sixth aspect, alone or in combination with one or more of the first through fifth aspects, the output setting comprises at least one of a dimension of the displayed content that corresponds to the dimension of the rollable display panel, or an aspect ratio of the displayed content.

In a seventh aspect, alone or in combination with one or more of the first through sixth aspects, process 600 includes controlling, by the display device, an adjustment mechanism to adjust the dimension to correspond to a graphical dimension of content being presented on the display.

In an eighth aspect, alone or in combination with one or more of the first through seventh aspects, the distance measurement is received based on at least one of a portion of the rollable display panel being unrolled from a roller, or a portion of the rollable display panel being rolled over the roller.

In a ninth aspect, alone or in combination with one or more of the first through eighth aspects, one or more components of the sensor are positioned within a section of a housing that is slidable along a chassis of the display device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
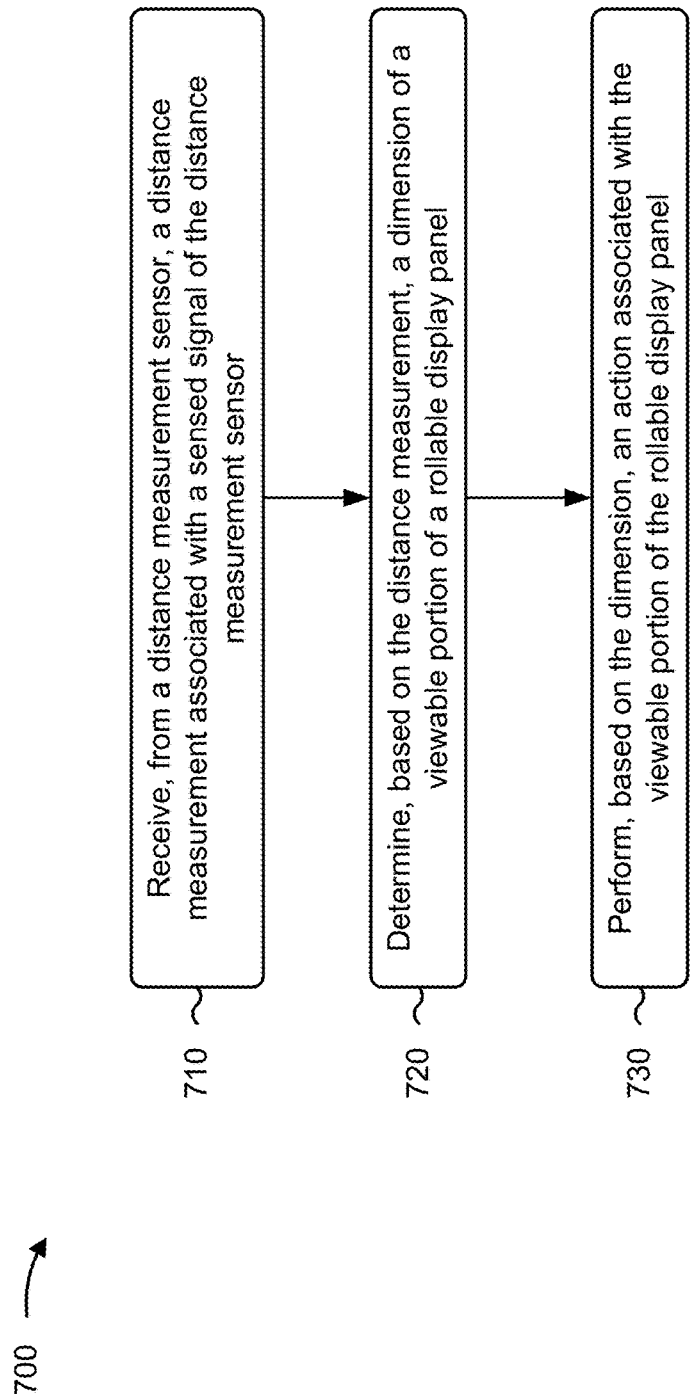

FIG. 7 is a diagram illustrating an example process 700 performed, for example, by a display device, in accordance with the present disclosure. Example process 700 is an example where the display device (e.g., a display device of user device 110 and/or wireless communication device 120) performs operations associated with management of a rollable display panel of a display device.

As shown in FIG. 7, in some aspects, process 700 may include receiving, from the distance measurement sensor, a distance measurement associated with a sensed signal of the distance measurement sensor (block 710). For example, the display device (e.g., using processor 210, memory 215, storage component 220, input component 225, output component 230, communication interface 235, sensor 240, and/or rollable display panel 245) may receive, from the distance measurement sensor, a distance measurement associated with a sensed signal of the distance measurement sensor, as described above.

As further shown in FIG. 7, in some aspects, process 700 may include determining, based on the distance measurement, a dimension of a viewable portion of the rollable display panel (block 720). For example, the display device (e.g., using processor 210, memory 215, storage component 220, input component 225, output component 230, communication interface 235, sensor 240, and/or rollable display panel 245) may determine, based on the distance measurement, a dimension of a viewable portion of the rollable display panel, as described above.

As further shown in FIG. 7, in some aspects, process 700 may include performing, based on the dimension, an action associated with the viewable portion of the rollable display panel (block 730). For example, the display device (e.g., using processor 210, memory 215, storage component 220, input component 225, output component 230, communication interface 235, sensor 240, and/or rollable display panel

245) may perform, based on the dimension, an action associated with the viewable portion of the rollable display panel, as described above.

Process 700 may include additional aspects, such as any single aspect or any combination of aspects described below and/or in connection with one or more other processes described elsewhere herein.

In a first aspect, the controller, to perform the action, is configured to at least one of configure, based on the distance, an output setting of displayed content on the rollable display panel to correspond to the viewable portion, or cause an adjustment mechanism of the display device to adjust the dimension of the viewable portion to correspond to the output setting of the displayed content on the rollable display panel.

In a second aspect, alone or in combination with the first aspect, process 700 includes a chassis, and a roller mounted to the chassis. The rollable display panel may be configured to be received by the roller when the dimension is reduced, or to extend from the roller when the dimension is increased.

In a third aspect, alone or in combination with one or more of the first and second aspects, the display device includes a first housing section that is mounted to the chassis and is configured to enclose the roller, and a second housing section that is mounted to the chassis and is configured to enclose the roller. The distance measurement sensor may be configured to measure a distance of a gap between the first housing section and the second housing section when the second housing section is extended from the first housing section.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method for configuring displayed content of a rollable display panel, comprising receiving, by a display device, a distance measurement from a sensor, the distance measurement being indicative of a dimension of the rollable display panel of the display device; and configuring, by the display device and based on the distance measurement, an output setting for displayed content of the rollable display panel according to the dimension.

Aspect 2: The method of Aspect 1, wherein the sensor includes a light emitter and a light receiver, a distance between the light emitter and the light receiver being configured to increase as a length of the dimension increases or decrease as a length of the dimension decreases.

Aspect 3: The method of any of Aspects 1 and 2, further comprising determining that the dimension satisfies a dimension threshold; monitoring, based on determining that the dimension satisfies the dimension threshold, movement data from another sensor of the display device; and causing, based on the movement data indicating that a movement characteristic of the display device satisfies a movement threshold, an adjustment mechanism to reduce a size of the dimension.

Aspect 4: The method of any of Aspects 1 through 3, further comprising receiving, from an adjustment mechanism that is configured to adjust the dimension, a counter position that is representative of the dimension of the rollable display panel; determining that a difference between the counter position of the dimension and a sensor value of the dimension that is determined from the distance measurement satisfies a difference threshold; and calibrating the counter of the adjustment mechanism to account for the difference.

Aspect 5: The method of any of Aspects 1 through 4, further comprising receiving another distance measurement that is indicative of an obstruction between a light emitter of the sensor and a light receiver of the sensor; determining a location of the obstruction relative to the displayed content; and configuring, based on the other distance measurement, the output setting of the displayed content to have an edge that aligns with the location of the obstruction.

Aspect 6: The method of any of Aspects 1 through 5, wherein the rollable display panel is configured to be received by a roller when the dimension is reduced or extended from the roller when the dimension is increased.

Aspect 7: The method of any of Aspects 1 through 6, wherein the output setting comprises at least one of a dimension of the displayed content that corresponds to the dimension of the rollable display panel or an aspect ratio of the displayed content.

Aspect 8: The method of any of Aspects 1 through 7, further comprising controlling, by the display device, an adjustment mechanism to adjust the dimension to correspond to a graphical dimension of content being presented on the display.

Aspect 9: The method of any of Aspects 1 through 8, wherein the distance measurement is received based on at least one of a portion of the rollable display panel being unrolled from a roller or a portion of the rollable display panel being rolled over the roller.

Aspect 10: The method of any of Aspects 1 through 9, wherein one or more components of the sensor are positioned within a section of a housing that is slidable along a chassis of the display device.

Aspect 11: A method for configuring displayed content of a rollable display panel, comprising receiving, by a display device and from a distance measurement sensor, a distance measurement associated with a sensed signal of the distance measurement sensor; determining, based on the distance measurement, a dimension of a viewable portion of a rollable display panel of the display device; and performing, by the display device and based on the dimension, an action associated with the viewable portion of the rollable display.

Aspect 12: The method of Aspect 11, wherein performing the action includes one or more of configuring based on the distance, an output setting of displayed content on the rollable display panel to correspond to the viewable portion, or causing an adjustment mechanism of the display device to adjust the dimension of the viewable portion to correspond to the output setting of the displayed content on the rollable display panel.

Aspect 13: The method of any of Aspects 11 and 12, wherein the rollable display panel is configured to be received by a roller of the display device when the dimension is reduced or extended from the roller when the dimension is increased.

Aspect 14: The method of any of Aspects 11 through 13, wherein the display device includes a first housing section that is mounted to the chassis and is configured to enclose the roller, and a second housing section that is mounted to the chassis and is configured to enclose the roller, and the distance measurement sensor is configured to measure a distance of a gap between the first housing section and the second housing section when the second housing section is extended from the first housing section.

Aspect 15: An apparatus for wireless communication at a device, comprising a processor; memory coupled with the processor; and instructions stored in the memory and executable by the processor to cause the apparatus to perform the method of one or more of Aspects 1 through 10.

Aspect 16: A device for wireless communication, comprising a memory and one or more processors coupled to the memory, the one or more processors configured to perform the method of one or more of Aspects 1 through 10.

Aspect 17: An apparatus for wireless communication, comprising at least one means for performing the method of one or more of Aspects 1 through 10.

Aspect 18: A non-transitory computer-readable medium storing code for wireless communication, the code comprising instructions executable by a processor to perform the method of one or more of Aspects 1 through 10.

Aspect 19: A non-transitory computer-readable medium storing a set of instructions for wireless communication, the set of instructions comprising one or more instructions that, when executed by one or more processors of a device, cause the device to perform the method of one or more of Aspects 1 through 10.

Aspect 20: An apparatus for wireless communication at a device, comprising a processor; memory coupled with the processor; and instructions stored in the memory and executable by the processor to cause the apparatus to perform the method of one or more of Aspects 11 through 14.

Aspect 21: A device for wireless communication, comprising a memory and one or more processors coupled to the memory, the one or more processors configured to perform the method of one or more of Aspects 11 through 14.

Aspect 22: An apparatus for wireless communication, comprising at least one means for performing the method of one or more of Aspects 11 through 14.

Aspect 23: A non-transitory computer-readable medium storing code for wireless communication, the code comprising instructions executable by a processor to perform the method of one or more of Aspects 11 through 14.

Aspect 24: A non-transitory computer-readable medium storing a set of instructions for wireless communication, the set of instructions comprising one or more instructions that, when executed by one or more processors of a device, cause the device to perform the method of one or more of Aspects 11 through 14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for configuring displayed content of a rollable display panel, comprising:
    receiving, by a display device, a distance measurement from a sensor,
        wherein the distance measurement is indicative of a dimension of the rollable display panel of the display device;
    configuring, by the display device and based on the distance measurement, an output setting for displayed content of the rollable display panel according to the dimension;
    receiving, from an adjustment mechanism that is configured to adjust the dimension, a counter position that is representative of the dimension of the rollable display panel;
    determining that a difference between the counter position of the dimension and a sensor value of the dimension that is determined from the distance measurement satisfies a difference threshold; and
    calibrating the counter of the adjustment mechanism to account for the difference.

2. The method of claim 1, wherein the sensor includes a light emitter and a light receiver,
    wherein a distance between the light emitter and the light receiver is configured to increase as a length of the dimension increases or decrease as a length of the dimension decreases.

3. The method of claim 1, further comprising:
determining that the dimension satisfies a dimension threshold;
monitoring, based on determining that the dimension satisfies the dimension threshold, movement data from another sensor of the display device; and
causing, based on the movement data indicating that a movement characteristic of the display device satisfies a movement threshold, an adjustment mechanism to reduce a size of the dimension.

4. The method of claim 1, wherein the distance measurement comprises a first distance measurement, the method further comprising:
receiving a second distance measurement that is indicative of an obstruction between a light emitter of the sensor and a light receiver of the sensor;
determining a location of the obstruction relative to the displayed content; and
configuring, based on the second distance measurement, the output setting of the displayed content to have an edge that aligns with the location of the obstruction.

5. The method of claim 1, wherein the rollable display panel is configured to be received by a roller when the dimension is reduced, or extended from the roller when the dimension is increased.

6. The method of claim 1, wherein the output setting comprises at least one of:
a dimension of the displayed content that corresponds to the dimension of the rollable display panel, or
an aspect ratio of the displayed content.

7. The method of claim 1, further comprising:
controlling, by the display device, the adjustment mechanism to adjust the dimension to correspond to a graphical dimension of content being presented on the display.

8. The method of claim 1, wherein the distance measurement is received based on at least one of:
a portion of the rollable display panel being unrolled from a roller, or
a portion of the rollable display panel being rolled over the roller.

9. The method of claim 1, wherein one or more components of the sensor are positioned within a section of a housing that is slidable along a chassis of the display device.

10. A non-transitory computer-readable medium storing a set of instructions, the set of instructions comprising:
one or more instructions that, when executed by one or more processors of a display device, cause the display device to:
receive a first distance measurement from a sensor, wherein the first distance measurement is indicative of a dimension of a rollable display panel of the display device;
configure, based on the first distance measurement, an output setting for displayed content of the rollable display panel according to the dimension;
receive a second distance measurement that is indicative of an obstruction between a light emitter of the sensor and a light receiver of the sensor;
determine a location of the obstruction relative to the displayed content and
configure, based on the second distance measurement, the output setting of the displayed content to have an edge that aligns with the location of the obstruction.

11. The non-transitory computer-readable medium of claim 10, wherein the sensor includes a light emitter and a light receiver,
wherein a distance between the light emitter and the light receiver is configured to increase as a length of the dimension increases or decrease as a length of the dimension decreases.

12. The non-transitory computer-readable medium of claim 10, wherein the one or more instructions further cause the display device to:
determine that the dimension satisfies a dimension threshold;
monitor, based on determining that the dimension threshold satisfies the dimension threshold, movement data from another sensor of the display device; and
cause, based on the movement data indicating that a movement characteristic of the display device satisfies a movement threshold, an adjustment mechanism to reduce a size of the dimension.

13. The non-transitory computer-readable medium of claim 10, wherein the one or more instructions further cause the display device to:
receive, from an adjustment mechanism that is configured to adjust the dimension, a counter position that is representative of the dimension of the rollable display panel;
determine that a difference between the counter position of the dimension and a sensor value of the dimension that is determined from the first distance measurement satisfies a difference threshold; and
calibrate the counter of the adjustment mechanism to account for the difference.

14. The non-transitory computer-readable medium of claim 10, wherein the rollable display panel is configured to be received by a roller when the dimension is reduced, or extended from the roller when the dimension is increased.

15. The non-transitory computer-readable medium of claim 10, wherein the output setting comprises at least one of:
a dimension of the displayed content that corresponds to the dimension of the rollable display panel, or
an aspect ratio of the displayed content.

16. The non-transitory computer-readable medium of claim 10, wherein one or more components of the sensor are configured to be positioned to measure a gap between sections of a housing of the display device that are movable to permit the rollable display panel to be rolled or unrolled by a roller.

17. An apparatus of a display device, comprising:
means for receiving a distance measurement from a sensor,
wherein the distance measurement is indicative of a dimension of a rollable display panel of the display device;
means for configuring, based on the distance measurement, an output setting for displayed content of the rollable display panel according to the dimensions;
means for receiving, from an adjustment mechanism that is configured to adjust the dimension, a counter position that is representative of the dimension of the rollable display panel;
means for determining that a difference between the counter position of the dimension and a sensor value of the dimension that is determined from the distance measurement satisfies a difference threshold; and
means for calibrating the counter of the adjustment mechanism to account for the difference.

18. The apparatus of claim 17, wherein the sensor includes a light emitter and a light receiver, wherein a distance between the light emitter and the light receiver is configured to increase as a length of the dimension increases or decrease as a length of the dimension decreases.

19. The apparatus of claim 17, further comprising:
means for determining that the dimension satisfies a dimension threshold;
monitoring, based on determining that the dimension threshold satisfies the dimension threshold, movement data from another sensor of the display device; and
means for causing, based on the movement data indicating that a movement characteristic of the display device satisfies a movement threshold, an adjustment mechanism to reduce a size of the dimension.

20. The apparatus of claim 17, wherein the distance measurement comprises a first distance measurement, the apparatus further comprising:
means for receiving a second distance measurement that is indicative of an obstruction between a light emitter of the sensor and a light receiver of the sensor;
means for determining a location of the obstruction relative to the displayed content; and
means for configuring, based on the second distance measurement, the output setting of the displayed content to have an edge that aligns with the location of the obstruction.

21. The apparatus of claim 17, wherein the rollable display panel is configured to be received by a roller when the dimension is reduced or extended from the roller when the dimension is increased.

22. The apparatus of claim 17, wherein the output setting comprises at least one of:
a dimension of the displayed content that corresponds to the dimension of the rollable display panel, or
an aspect ratio of the displayed content.

23. The apparatus of claim 17, wherein one or more components of the sensor are configured to be positioned to measure a gap between sections of a housing of the display device that are movable to permit the rollable display panel to be rolled or unrolled by a roller.

24. A display device comprising:
a rollable display panel;
a distance measurement sensor; and
a controller configured to:
receive, from the distance measurement sensor, a first distance measurement associated with a sensed signal of the distance measurement sensor;
determine, based on the first distance measurement, a dimension of a viewable portion of the rollable display panel;
perform, based on the dimension, an action associated with the viewable portion of the rollable display panel;
receive a second distance measurement that is indicative of an obstruction between a light emitter of the distance measurement sensor and a light receiver of the distance measurement sensor;
determine a location of the obstruction relative to content displayed on the rollable display panel; and
configure, based on the second distance measurement, an output setting of the content displayed on the rollable display panel to have an edge that aligns with the location of the obstruction.

25. The display device of claim 24, wherein the controller, to perform the action, is configured to:
cause an adjustment mechanism of the display device to adjust the dimension of the viewable portion to correspond to the output setting of the content displayed on the rollable display panel.

26. The display device of claim 24, further comprising:
a chassis; and
a roller mounted to the chassis,
wherein the rollable display panel is configured to be:
received by the roller when the dimension is reduced, or
extended from the roller when the dimension is increased.

27. The display device of claim 26, further comprising:
a first housing section that is mounted to the chassis and is configured to enclose the roller; and
a second housing section that is mounted to the chassis and is configured to enclose the roller,
wherein the distance measurement sensor is configured to measure a distance of a gap between the first housing section and the second housing section when the second housing section is extended from the first housing section.

28. The display device of claim 24, wherein the controller, to perform the action, is configured to:
determine that the dimension satisfies a dimension threshold;
monitor, based on determining that the dimension threshold satisfies the dimension threshold, movement data from another sensor of the display device; and
cause, based on the movement data indicating that a movement characteristic of the display device satisfies a movement threshold, an adjustment mechanism to reduce a size of the dimension.

29. The display device of claim 24, wherein the controller is further configured to:
receive, from an adjustment mechanism that is configured to adjust the dimension, a counter position that is representative of the dimension of the rollable display panel;
determine that a difference between the counter position of the dimension and a sensor value of the dimension that is determined from the first distance measurement satisfies a difference threshold; and
calibrate the counter of the adjustment mechanism to account for the difference.

30. The display device of claim 24, wherein the controller, to perform the action, is configured to:
configure, based on the distance, the output setting of content displayed on the rollable display panel to correspond to the viewable portion.

\* \* \* \* \*